United States Patent
Satat et al.

(10) Patent No.: US 11,618,167 B2
(45) Date of Patent: Apr. 4, 2023

(54) PIXELWISE FILTERABLE DEPTH MAPS FOR ROBOTS

(71) Applicant: X Development LLC, Mountain View, CA (US)

(72) Inventors: Guy Satat, Mountain View, CA (US); Michael Quinlan, Mountain View, CA (US)

(73) Assignee: X Development LLC, Mountain View, CA (US)

( * ) Notice: Subject to any disclaimer, the term of this patent is extended or adjusted under 35 U.S.C. 154(b) by 356 days.

(21) Appl. No.: 16/726,769

(22) Filed: Dec. 24, 2019

(65) Prior Publication Data

US 2021/0187748 A1    Jun. 24, 2021

(51) Int. Cl.
*B25J 9/16* (2006.01)
*G06T 7/593* (2017.01)
*B25J 19/02* (2006.01)

(52) U.S. Cl.
CPC .......... *B25J 9/1697* (2013.01); *B25J 9/1664* (2013.01); *B25J 19/022* (2013.01); *B25J 19/023* (2013.01);
(Continued)

(58) Field of Classification Search
CPC ...... B25J 9/1697; B25J 9/1664; B25J 19/022; B25J 19/023; G06T 7/593; G06T 7/564; G06T 2207/10012; G06T 2207/10028; G06T 2207/10016; G06T 2207/10021; G06T 2207/20081; G06T 2207/20084; G05D 1/024; G05D 1/0274; G05D 1/0216
See application file for complete search history.

(56) References Cited

U.S. PATENT DOCUMENTS

| | | | |
|---|---|---|---|
| 8,831,367 B2 * | 9/2014 | Venkataraman | G06T 9/20 382/233 |
| 2011/0001799 A1 * | 1/2011 | Rothenberger | G06T 7/50 348/47 |

(Continued)

FOREIGN PATENT DOCUMENTS

| | | | | |
|---|---|---|---|---|
| CA | 2824606 A1 * | 7/2012 | | B25J 19/02 |
| CA | 2928262 | 7/2012 | | |
| WO | WO-2018037079 A1 * | 3/2018 | | G06T 15/06 |

*Primary Examiner* — Abby Y Lin
*Assistant Examiner* — Dylan Brandon Mooney
(74) *Attorney, Agent, or Firm* — McDonnell Boehnen Hulbert & Berghoff LLP

(57) ABSTRACT

A method includes receiving sensor data from a plurality of robot sensors on a robot. The method includes generating a depth map that includes a plurality of pixel depths. The method includes determining, for each respective pixel depth, based on the at least one robot sensor associated with the respective pixel depth, a pixelwise confidence level indicative of a likelihood that the respective pixel depth accurately represents a distance between the robot and a feature of the environment. The method includes generating a pixelwise filterable depth map for a control system of the robot. The pixelwise filterable depth map is filterable to produce a robot operation specific depth map. The robot operation specific depth map is determined based on a comparison of each respective pixelwise confidence level with a confidence threshold corresponding to at least one operation of the robot controlled by the control system of the robot.

20 Claims, 10 Drawing Sheets

(52) U.S. Cl.
CPC .... *G06T 7/593* (2017.01); *G06T 2207/10012* (2013.01); *G06T 2207/10028* (2013.01)

(56) References Cited

U.S. PATENT DOCUMENTS

| | | | |
|---|---|---|---|
| 2014/0032033 A1* | 1/2014 | Einecke | A01D 75/185 |
| | | | 701/27 |
| 2018/0232859 A1 | 8/2018 | Siddiqui et al. | |
| 2019/0057513 A1* | 2/2019 | Jain | G06T 7/194 |
| 2019/0362511 A1* | 11/2019 | Jouppi | G06T 5/50 |
| 2020/0234071 A1* | 7/2020 | Yuvaraj | G06V 10/82 |
| 2020/0394810 A1* | 12/2020 | Islam | H04N 13/271 |

* cited by examiner

PIXELWISE FILTERABLE DEPTH MAPS FOR ROBOTS

BACKGROUND

As technology advances, various types of robotic devices are being created for performing a variety of functions that may assist users. Robotic devices may be used for applications involving material handling, transportation, welding, assembly, and dispensing, among others. Over time, the manner in which these robotic systems operate is becoming more intelligent, efficient, and intuitive. As robotic systems become increasingly prevalent in numerous aspects of modern life, it is desirable for robotic systems to be efficient. Therefore, a demand for efficient robotic systems has helped open up a field of innovation in actuators, movement, sensing techniques, as well as component design and assembly.

SUMMARY

Example embodiments involve a computing device configured for generating a pixelwise filterable depth map having pixelwise confidences indicative how accurately each pixel depth represents a distance. Example embodiments further relate to comparing the pixelwise confidences to a threshold confidence to generate a robot operation specific depth map for a robot. Different operations of the robot can correspond to different confidence levels, such that the robot operation specific depth map can dynamically change depending on the operation of the robot.

In an embodiment, a method is provided. The method includes receiving sensor data from a plurality of robot sensors on a robot. The sensor data includes a plurality of pixels that represent an environment of the robot. The method includes generating a depth map that includes a plurality of pixel depths. Each pixel depth is determined based on the sensor data, and each pixel depth is associated with at least one robot sensor of the plurality of robot sensors. The method includes determining, for each respective pixel depth, based on the at least one robot sensor associated with the respective pixel depth, a pixelwise confidence level indicative of a likelihood that the respective pixel depth accurately represents a distance between the robot and a feature of the environment. The method includes generating a pixelwise filterable depth map for a control system of the robot. The pixelwise filterable depth map is filterable to produce a robot operation specific depth map. The robot operation specific depth map is determined based on a comparison of each respective pixelwise confidence level with a confidence threshold corresponding to at least one operation of the robot controlled by the control system of the robot.

In another embodiment, a robot is provided. The robot includes a first sensor, a second sensor, a computing having one or more processors, a non-transitory computer readable medium, and program instructions stored on the non-transitory computer readable medium and executable by the one or more processors. The program instructions are executable by the one or more processors to receive sensor data from the first sensor and the second sensor. The sensor data comprises a plurality of pixels that represent an environment of the robot. The program instructions are executable by the one or more processors to generate a depth map that includes a plurality of pixel depths. Each pixel depth is determined based on the sensor data, and wherein each pixel depth is associated with at least one robot sensor of the plurality of robot sensors. The program instructions are executable by the one or more processors to determine, for each respective pixel depth, based on the at least one robot sensor associated with the respective pixel depth, a pixelwise confidence level indicative of a likelihood that the respective pixel depth accurately represents a distance between the robot and a feature of the environment. The program instructions are executable by the one or more processors to generate a pixelwise filterable depth map for a control system of the robot. The pixelwise filterable depth map is filterable to produce a robot operation specific depth map. The robot operation specific depth map is determined based on a comparison of each respective pixelwise confidence level with a confidence threshold corresponding to at least one operation of the robot controlled by the control system of the robot.

In a further embodiment, a non-transitory computer readable medium is provided. The non-transitory computer readable medium has stored therein instructions executable by one or more processors to cause a computing system to perform functions. The functions include receiving sensor data from a plurality of robot sensors on a robot. The sensor data includes a plurality of pixels that represent an environment of the robot. The functions include generating a depth map that includes a plurality of pixel depths. Each pixel depth is determined based on the sensor data, and each pixel depth is associated with at least one robot sensor of the plurality of robot sensors. The functions include determining, for each respective pixel depth, based on the at least one robot sensor associated with the respective pixel depth, a pixelwise confidence level indicative of a likelihood that the respective pixel depth accurately represents a distance between the robot and a feature of the environment. The functions include generating a pixelwise filterable depth map for a control system of the robot. The pixelwise filterable depth map is filterable to produce a robot operation specific depth map. The robot operation specific depth map is determined based on a comparison of each respective pixelwise confidence level with a confidence threshold corresponding to at least one operation of the robot controlled by the control system of the robot.

In another embodiment, a system is provided. The system includes means for receiving sensor data from a plurality of robot sensors on a robot. The sensor data includes a plurality of pixels that represent an environment of the robot. The system includes means for generating a depth map that includes a plurality of pixel depths. Each pixel depth is determined based on the sensor data, and each pixel depth is associated with at least one robot sensor of the plurality of robot sensors. The system includes means for determining, for each respective pixel depth, based on the at least one robot sensor associated with the respective pixel depth, a pixelwise confidence level indicative of a likelihood that the respective pixel depth accurately represents a distance between the robot and a feature of the environment. The system includes means for generating a pixelwise filterable depth map for a control system of the robot. The pixelwise filterable depth map is filterable to produce a robot operation specific depth map. The robot operation specific depth map is determined based on a comparison of each respective pixelwise confidence level with a confidence threshold corresponding to at least one operation of the robot controlled by the control system of the robot.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

DETAILED DESCRIPTION

Figure 1:
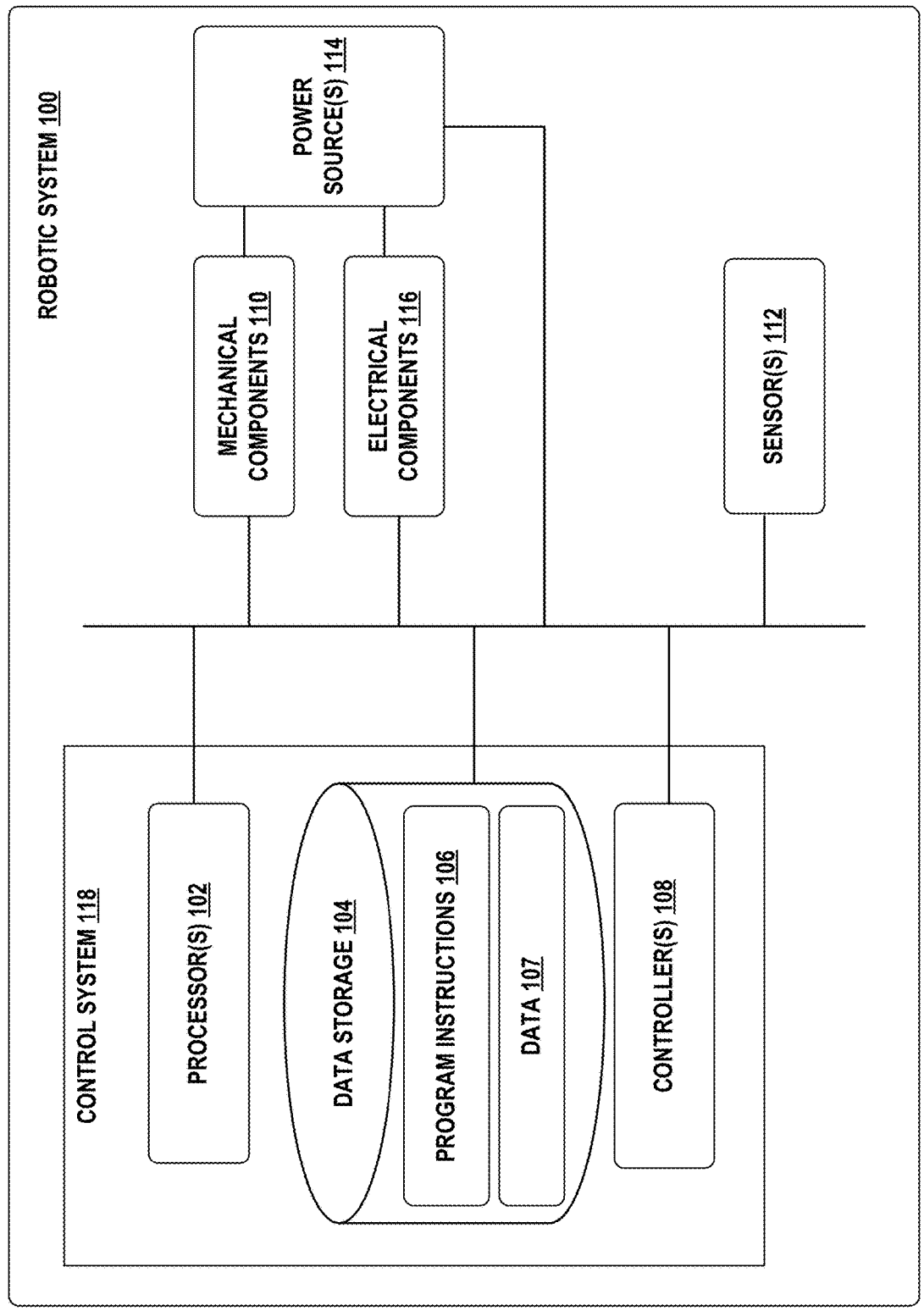
FIG. 1 illustrates a configuration of a robotic system, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless indicated as such. Other embodiments can be utilized, and other changes can be made, without departing from the scope of the subject matter presented herein.

Thus, the example embodiments described herein are not meant to be limiting. It will be readily understood that the aspects of the present disclosure, as generally described herein, and illustrated in the figures, can be arranged, substituted, combined, separated, and designed in a wide variety of different configurations.

Throughout this description, the articles "a" or "an" are used to introduce elements of the example embodiments. Any reference to "a" or "an" refers to "at least one," and any reference to "the" refers to "the at least one," unless otherwise specified, or unless the context clearly dictates otherwise. The intent of using the conjunction "or" within a described list of at least two terms is to indicate any of the listed terms or any combination of the listed terms.

The use of ordinal numbers such as "first," "second," "third" and so on is to distinguish respective elements rather than to denote a particular order of those elements. For purpose of this description, the terms "multiple" and "a plurality of" refer to "two or more" or "more than one."

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment. In the figures, similar symbols typically identify similar components, unless context dictates otherwise. Further, unless otherwise noted, figures are not drawn to scale and are used for illustrative purposes only. Moreover, the figures are representational only and not all components are shown. For example, additional structural or restraining components might not be shown.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. OVERVIEW

A depth map typically includes a two-dimensional (2D) representation of a three-dimensional (3D) space. In particular, a 2D array of pixel depths can show 3D features in an environment that are captured from a sensor. Depth maps are typically derived from a particular sensor or configurations of sensors. Generating depth data from different sensors may result in different resolutions between pixel depths and accuracy levels of pixel depths. For example, a Light Ranging and Detection (LIDAR) device may obtain data by emitting light pulses within an environment and detecting reflected light pulses. Detecting a time of flight of each respective reflected pulse provides an accurate distance estimate, but there may be less spatial data available than that provided by depth maps derived from images, such as multiscopic images. Different sensors may also have difficulty representing depth information for certain parts of an environment. For example, a stereoscopic image capture device may result in a depth map that does not reliably produce depth information for transparent, partially-transparent, refractive, specular, or textureless materials, such as windows, and can also be inhibited by occlusions, but may otherwise provide a relatively accurate representation of other objects and/or targets within the environment. By contrast, monoscopic images may produce more complete depth information that represents such transparent, partially-transparent, refractive, specular materials, or textureless materials, and not be inhibited by occlusions, but may be less accurate than depth maps derived from stereoscopic image data or LIDAR data. Having inaccurate or incomplete depth information about an environment can impact a system. For example, in the context of a robot using one or more sensors to determine a depth map of an environment, the robot may have difficulty navigating within the environment or interacting with objects in the environment when the depth map includes incomplete or inaccurate depth information. This may be particularly relevant when the robot first determines whether to perform an operation based on a confidence score for accomplishing the operation successfully.

Example embodiments involve a depth map derived by fusing depth information from a plurality of sensors. Some sensors may provide more reliable depth information than others. For example, a LIDAR device may be more accurate than a multiscopic image capture device, which in turn may be more accurate than a monoscopic image capture device. In these example embodiments, different portions of the depth map may be attributable to different sensors, and thus a system may be less confident in some portions of the depth map than others. In addition, confidence in depth information can be influenced by lighting, the presence of occlusions in an environment, or other characteristics.

Example embodiments involve generating a pixelwise filterable depth map based on which sensor is associated with each pixel depth in a depth map. Each pixel depth can be associated with a confidence level that can be based on part on which sensor is associated with that pixel depth. For example, in a depth map derived from two sensors, a first confidence level can be associated with some pixel depths and a second confidence level can be associated with other pixel depths.

Example embodiments further determine pixelwise confidence levels based on whether two or more sensors have corroborating depth information. For example, a degree of similarity between compared pixel depths from two or more sensors can be determined. A higher degree of similarity may increase confidence that the pixel depths are accurate. In this manner, corroborated sections of a depth map can be identified as being more likely accurate than uncorroborated sections of the depth map.

Example embodiments involve a robot and operations of the robot that use depth information. For example, navigating in an environment and/or interacting with objects in the environment can involve using a depth map to sense distances between the robot and different objects in the environment. Different operations may necessitate different levels of confidence for purposes of an operation. For example, in order to navigate in a given direction, a particular confidence threshold for distance information can be used. Thus, an operation specific depth map can be generated so that only depth information above the confidence threshold is used for a robot operation. This can allow for a robot to organically determine how to (or whether to) perform a task using depth information. As an example result of this analysis, a robot can dynamically navigate in portions of an environment associated with higher confidences associated with depth information. Other contexts for leveraging operation specific depth maps can include object detecting operations and object interaction operations. Other operations are possible.

By providing a control system of a robot with a pixelwise filterable depth map, the robot can dynamically switch between tasks that have different confidence thresholds while using the same base depth map and sensor system.

II. EXAMPLE ROBOTIC SYSTEMS

FIG. 1 illustrates an example configuration of a robotic system that may be used in connection with the implementations described herein. Robotic system 100 may be configured to operate autonomously, semi-autonomously, or using directions provided by user(s). Robotic system 100 may be implemented in various forms, such as a robotic arm, industrial robot, or some other arrangement. Some example implementations involve a robotic system 100 engineered to be low cost at scale and designed to support a variety of tasks. Robotic system 100 may be designed to be capable of operating around people. Robotic system 100 may also be optimized for machine learning. Throughout this description, robotic system 100 may also be referred to as a robot, robotic device, or mobile robot, among other designations.

As shown in FIG. 1, robotic system 100 may include processor(s) 102, data storage 104, and controller(s) 108, which together may be part of control system 118. Robotic system 100 may also include sensor(s) 112, power source(s) 114, mechanical components 110, and electrical components 116. Nonetheless, robotic system 100 is shown for illustrative purposes, and may include more or fewer components. The various components of robotic system 100 may be connected in any manner, including wired or wireless connections. Further, in some examples, components of robotic system 100 may be distributed among multiple physical entities rather than a single physical entity. Other example illustrations of robotic system 100 may exist as well.

Processor(s) 102 may operate as one or more general-purpose hardware processors or special purpose hardware processors (e.g., digital signal processors, application specific integrated circuits, etc.). Processor(s) 102 may be configured to execute computer-readable program instructions 106, and manipulate data 107, both of which are stored in data storage 104. Processor(s) 102 may also directly or indirectly interact with other components of robotic system 100, such as sensor(s) 112, power source(s) 114, mechanical components 110, or electrical components 116.

Data storage 104 may be one or more types of hardware memory. For example, data storage 104 may include or take the form of one or more computer-readable storage media that can be read or accessed by processor(s) 102. The one or more computer-readable storage media can include volatile or non-volatile storage components, such as optical, magnetic, organic, or another type of memory or storage, which can be integrated in whole or in part with processor(s) 102. In some implementations, data storage 104 can be a single physical device. In other implementations, data storage 104 can be implemented using two or more physical devices, which may communicate with one another via wired or wireless communication. As noted previously, data storage 104 may include the computer-readable program instructions 106 and data 107. Data 107 may be any type of data, such as configuration data, sensor data, or diagnostic data, among other possibilities.

Controller 108 may include one or more electrical circuits, units of digital logic, computer chips, or microprocessors that are configured to (perhaps among other tasks), interface between any combination of mechanical components 110, sensor(s) 112, power source(s) 114, electrical components 116, control system 118, or a user of robotic system 100. In some implementations, controller 108 may be a purpose-built embedded device for performing specific operations with one or more subsystems of the robotic system 100.

Control system 118 may monitor and physically change the operating conditions of robotic system 100. In doing so, control system 118 may serve as a link between portions of robotic system 100, such as between mechanical components 110 or electrical components 116. In some instances, control system 118 may serve as an interface between robotic system 100 and another computing device. Further, control system 118 may serve as an interface between robotic system 100 and a user. In some instances, control system 118 may include various components for communicating with robotic system 100, including a joystick, buttons, or ports, etc. The example interfaces and communications noted above may be implemented via a wired or wireless connection, or both. Control system 118 may perform other operations for robotic system 100 as well.

During operation, control system 118 may communicate with other systems of robotic system 100 via wired or wireless connections, and may further be configured to communicate with one or more users of the robot. As one possible illustration, control system 118 may receive an input (e.g., from a user or from another robot) indicating an instruction to perform a requested task, such as to pick up and move an object from one location to another location. Based on this input, control system 118 may perform operations to cause the robotic system 100 to make a sequence of movements to perform the requested task. As another illustration, a control system may receive an input indicating an instruction to move to a requested location. In response, control system 118 (perhaps with the assistance of other components or systems) may determine a direction and speed to move robotic system 100 through an environment en route to the requested location.

Operations of control system 118 may be carried out by processor(s) 102. Alternatively, these operations may be carried out by controller(s) 108, or a combination of processor(s) 102 and controller(s) 108. In some implementations, control system 118 may partially or wholly reside on a device other than robotic system 100, and therefore may at least in part control robotic system 100 remotely.

Mechanical components 110 represent hardware of robotic system 100 that may enable robotic system 100 to perform physical operations. As a few examples, robotic system 100 may include one or more physical members, such as an arm, an end effector, a head, a neck, a torso, a base, and wheels. The physical members or other parts of robotic system 100 may further include actuators arranged to move the physical members in relation to one another. Robotic system 100 may also include one or more structured bodies for housing control system 118 or other components, and may further include other types of mechanical components. The particular mechanical components 110 used in a given robot may vary based on the design of the robot, and may also be based on the operations or tasks the robot may be configured to perform.

In some examples, mechanical components 110 may include one or more removable components. Robotic system 100 may be configured to add or remove such removable components, which may involve assistance from a user or another robot. For example, robotic system 100 may be configured with removable end effectors or digits that can be replaced or changed as needed or desired. In some implementations, robotic system 100 may include one or more removable or replaceable battery units, control systems, power systems, bumpers, or sensors. Other types of removable components may be included within some implementations.

Robotic system 100 may include sensor(s) 112 arranged to sense aspects of robotic system 100. Sensor(s) 112 may include one or more force sensors, torque sensors, velocity sensors, acceleration sensors, position sensors, proximity sensors, motion sensors, location sensors, load sensors, temperature sensors, touch sensors, depth sensors, ultrasonic range sensors, infrared sensors, object sensors, or cameras, among other possibilities. Within some examples, robotic system 100 may be configured to receive sensor data from sensors that are physically separated from the robot (e.g., sensors that are positioned on other robots or located within the environment in which the robot is operating).

Sensor(s) 112 may provide sensor data to processor(s) 102 (perhaps by way of data 107) to allow for interaction of robotic system 100 with its environment, as well as monitoring of the operation of robotic system 100. The sensor data may be used in evaluation of various factors for activation, movement, and deactivation of mechanical components 110 and electrical components 116 by control system 118. For example, sensor(s) 112 may capture data corresponding to the terrain of the environment or location of nearby objects, which may assist with environment recognition and navigation.

In some examples, sensor(s) 112 may include RADAR (e.g., for long-range object detection, distance determination, or speed determination), LIDAR (e.g., for short-range object detection, distance determination, or speed determination), SONAR (e.g., for underwater object detection, distance determination, or speed determination), VICON® (e.g., for motion capture), one or more cameras (e.g., stereoscopic cameras for 3D vision), a global positioning system (GPS) transceiver, or other sensors for capturing information of the environment in which robotic system 100 is operating. Sensor(s) 112 may monitor the environment in real time, and detect obstacles, elements of the terrain, weather conditions, temperature, or other aspects of the environment. In another example, sensor(s) 112 may capture data corresponding to one or more characteristics of a target or identified object, such as a size, shape, profile, structure, or orientation of the object.

Further, robotic system 100 may include sensor(s) 112 configured to receive information indicative of the state of robotic system 100, including sensor(s) 112 that may monitor the state of the various components of robotic system 100. Sensor(s) 112 may measure activity of systems of robotic system 100 and receive information based on the operation of the various features of robotic system 100, such as the operation of an extendable arm, an end effector, or other mechanical or electrical features of robotic system 100. The data provided by sensor(s) 112 may enable control system 118 to determine errors in operation as well as monitor overall operation of components of robotic system 100.

As an example, robotic system 100 may use force/torque sensors to measure load on various components of robotic system 100. In some implementations, robotic system 100 may include one or more force/torque sensors on an arm or end effector to measure the load on the actuators that move one or more members of the arm or end effector. In some examples, the robotic system 100 may include a force/torque sensor at or near the wrist or end effector, but not at or near other joints of a robotic arm. In further examples, robotic system 100 may use one or more position sensors to sense the position of the actuators of the robotic system. For instance, such position sensors may sense states of extension, retraction, positioning, or rotation of the actuators on an arm or end effector.

As another example, sensor(s) 112 may include one or more velocity or acceleration sensors. For instance, sensor(s) 112 may include an inertial measurement unit (IMU). The IMU may sense velocity and acceleration in the world frame, with respect to the gravity vector. The velocity and acceleration sensed by the IMU may then be translated to that of robotic system 100 based on the location of the IMU in robotic system 100 and the kinematics of robotic system 100.

Robotic system 100 may include other types of sensors not explicitly discussed herein. Additionally or alternatively, the robotic system may use particular sensors for purposes not enumerated herein.

Robotic system 100 may also include one or more power source(s) 114 configured to supply power to various components of robotic system 100. Among other possible power systems, robotic system 100 may include a hydraulic system, electrical system, batteries, or other types of power systems. As an example illustration, robotic system 100 may include one or more batteries configured to provide charge to components of robotic system 100. Some of mechanical components 110 or electrical components 116 may each connect to a different power source, may be powered by the same power source, or be powered by multiple power sources.

Any type of power source may be used to power robotic system 100, such as electrical power or a gasoline engine. Additionally or alternatively, robotic system 100 may include a hydraulic system configured to provide power to mechanical components 110 using fluid power. Components of robotic system 100 may operate based on hydraulic fluid being transmitted throughout the hydraulic system to various hydraulic motors and hydraulic cylinders, for example. The hydraulic system may transfer hydraulic power by way of pressurized hydraulic fluid through tubes, flexible hoses, or other links between components of robotic system 100. Power source(s) 114 may charge using various types of charging, such as wired connections to an outside power source, wireless charging, combustion, or other examples.

Electrical components 116 may include various mechanisms capable of processing, transferring, or providing electrical charge or electric signals. Among possible examples, electrical components 116 may include electrical wires, circuitry, or wireless communication transmitters and receivers to enable operations of robotic system 100. Electrical components 116 may interwork with mechanical components 110 to enable robotic system 100 to perform various operations. Electrical components 116 may be configured to provide power from power source(s) 114 to the various mechanical components 110, for example. Further, robotic system 100 may include electric motors. Other examples of electrical components 116 may exist as well.

Robotic system 100 may include a body, which may connect to or house appendages and components of the robotic system. As such, the structure of the body may vary within examples and may further depend on particular operations that a given robot may have been designed to perform. For example, a robot developed to carry heavy loads may have a wide body that enables placement of the load. Similarly, a robot designed to operate in tight spaces may have a relatively tall, narrow body. Further, the body or the other components may be developed using various types of materials, such as metals or plastics. Within other examples, a robot may have a body with a different structure or made of various types of materials.

The body or the other components may include or carry sensor(s) 112. These sensors may be positioned in various locations on the robotic system 100, such as on a body, a head, a neck, a base, a torso, an arm, or an end effector, among other examples.

Robotic system 100 may be configured to carry a load, such as a type of cargo that is to be transported. In some examples, the load may be placed by the robotic system 100 into a bin or other container attached to the robotic system 100. The load may also represent external batteries or other types of power sources (e.g., solar panels) that the robotic system 100 may utilize. Carrying the load represents one example use for which the robotic system 100 may be configured, but the robotic system 100 may be configured to perform other operations as well.

As noted above, robotic system 100 may include various types of appendages, wheels, end effectors, gripping devices and so on. In some examples, robotic system 100 may include a mobile base with wheels, treads, or some other form of locomotion. Additionally, robotic system 100 may include a robotic arm or some other form of robotic manipulator. In the case of a mobile base, the base may be considered as one of mechanical components 110 and may include wheels, powered by one or more of actuators, which allow for mobility of a robotic arm in addition to the rest of the body.

Figure 2:
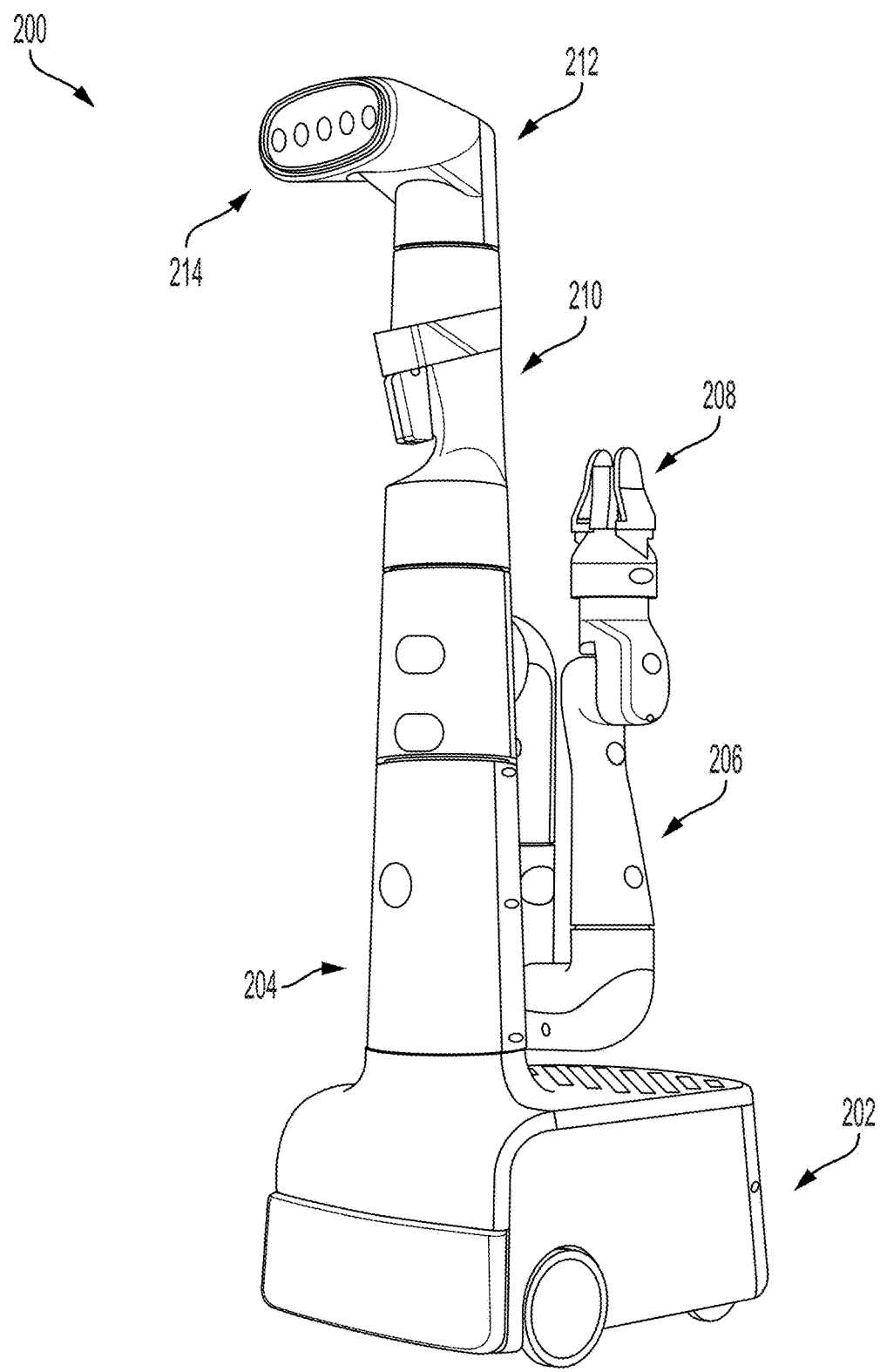
FIG. 2 illustrates a mobile robot, in accordance with example embodiments.
Figure 3:
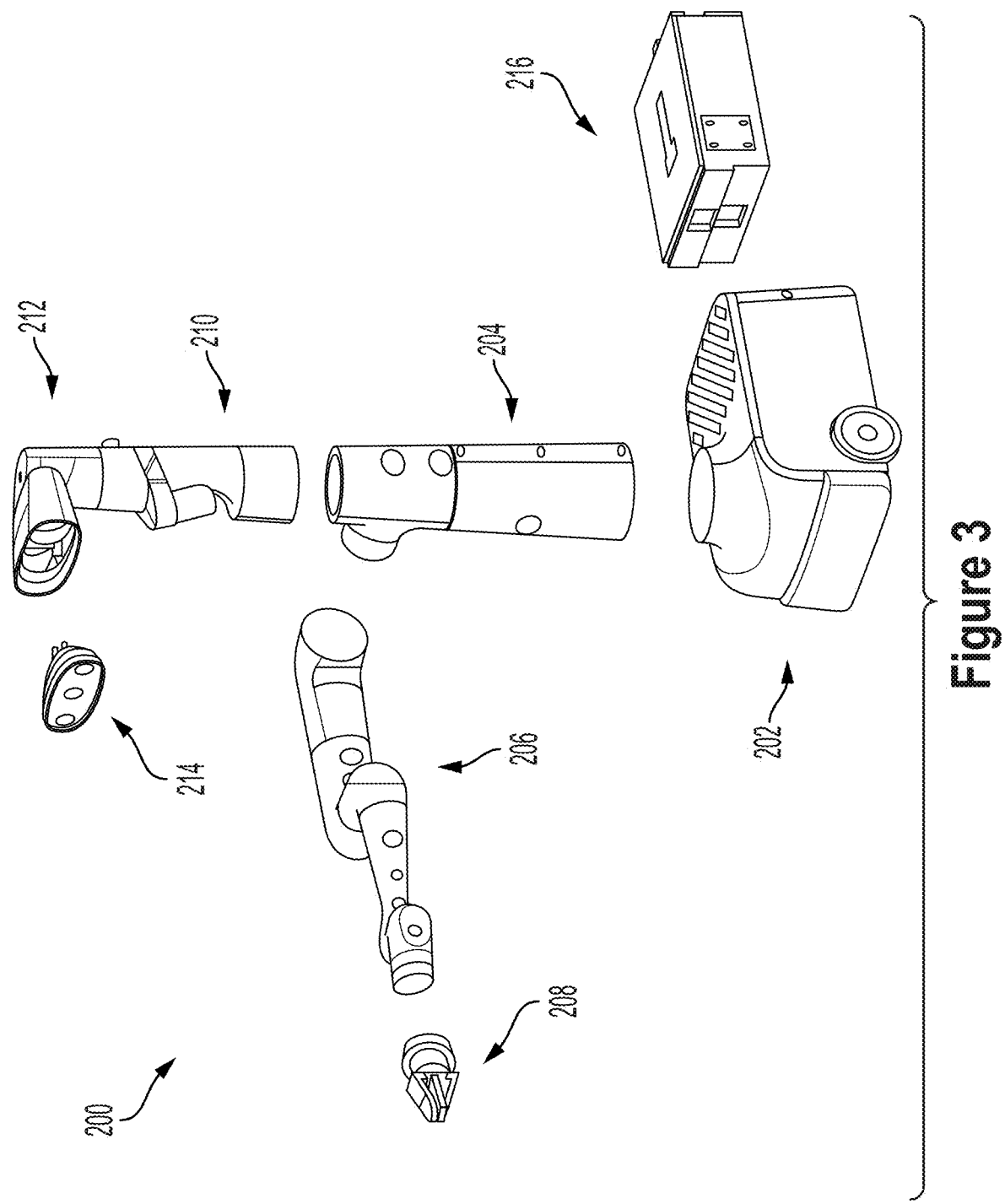
FIG. 3 illustrates an exploded view of a mobile robot, in accordance with example embodiments.

FIG. 2 illustrates a mobile robot, in accordance with example embodiments. FIG. 3 illustrates an exploded view of the mobile robot, in accordance with example embodiments. More specifically, a robot 200 may include a mobile base 202, a midsection 204, an arm 206, an end-of-arm system (EOAS) 208, a mast 210, a perception housing 212, and a perception suite 214. The robot 200 may also include a compute box 216 stored within mobile base 202.

The mobile base 202 includes two drive wheels positioned at a front end of the robot 200 in order to provide locomotion to robot 200. The mobile base 202 also includes additional casters (not shown) to facilitate motion of the mobile base 202 over a ground surface. The mobile base 202 may have a modular architecture that allows compute box 216 to be easily removed. Compute box 216 may serve as a removable control system for robot 200 (rather than a mechanically integrated control system). After removing external shells, the compute box 216 can be easily removed and/or replaced. The mobile base 202 may also be designed to allow for additional modularity. For example, the mobile base 202 may also be designed so that a power system, a battery, and/or external bumpers can all be easily removed and/or replaced.

The midsection 204 may be attached to the mobile base 202 at a front end of the mobile base 202. The midsection 204 includes a mounting column which is fixed to the mobile base 202. The midsection 204 additionally includes a rotational joint for arm 206. More specifically, the midsection 204 includes the first two degrees of freedom for arm 206 (a shoulder yaw J0 joint and a shoulder pitch J1 joint). The mounting column and the shoulder yaw J0 joint may form a portion of a stacked tower at the front of mobile base 202. The mounting column and the shoulder yaw J0 joint may be coaxial. The length of the mounting column of midsection 204 may be chosen to provide the arm 206 with sufficient height to perform manipulation tasks at commonly encountered height levels (e.g., coffee table top and counter top levels). The length of the mounting column of midsection 204 may also allow the shoulder pitch J1 joint to rotate the arm 206 over the mobile base 202 without contacting the mobile base 202.

The arm 206 may be a 7DOF robotic arm when connected to the midsection 204. As noted, the first two DOFs of the arm 206 may be included in the midsection 204. The remaining five DOFs may be included in a standalone section of the arm 206 as illustrated in FIGS. 2 and 3. The arm 206 may be made up of plastic monolithic link structures. Inside the arm 206 may be housed standalone actuator modules, local motor drivers, and thru bore cabling.

The EOAS 208 may be an end effector at the end of arm 206. EOAS 208 may allow the robot 200 to manipulate objects in the environment. As shown in FIGS. 2 and 3, EOAS 208 may be a gripper, such as an underactuated pinch gripper. The gripper may include one or more contact sensors such as force/torque sensors and/or non-contact sensors such as one or more cameras to facilitate object detection and gripper control. EOAS 208 may also be a different type of gripper such as a suction gripper or a different type of tool such as a drill or a brush. EOAS 208 may also be swappable or include swappable components such as gripper digits.

The mast 210 may be a relatively long, narrow component between the shoulder yaw J0 joint for arm 206 and perception housing 212. The mast 210 may be part of the stacked tower at the front of mobile base 202. The mast 210 may be fixed relative to the mobile base 202. The mast 210 may be coaxial with the midsection 204. The length of the mast 210 may facilitate perception by perception suite 214 of objects being manipulated by EOAS 208. The mast 210 may have a length such that when the shoulder pitch J1 joint is rotated vertical up, a topmost point of a bicep of the arm 206 is approximately aligned with a top of the mast 210. The length of the mast 210 may then be sufficient to prevent a collision between the perception housing 212 and the arm 206 when the shoulder pitch J1 joint is rotated vertical up.

As shown in FIGS. 2 and 3, the mast 210 may include a 3D lidar sensor configured to collect depth information about the environment. The 3D lidar sensor may be coupled to a carved-out portion of the mast 210 and fixed at a downward angle. The lidar position may be optimized for localization, navigation, and for front cliff detection.

The perception housing 212 may include at least one sensor making up perception suite 214. The perception housing 212 may be connected to a pan/tilt control to allow for reorienting of the perception housing 212 (e.g., to view objects being manipulated by EOAS 208). The perception housing 212 may be a part of the stacked tower fixed to the mobile base 202. A rear portion of the perception housing 212 may be coaxial with the mast 210.

The perception suite 214 may include a suite of sensors configured to collect sensor data representative of the environment of the robot 200. The perception suite 214 may include an infrared (IR)-assisted stereo depth sensor. The perception suite 214 may additionally include a wide-angled red-green-blue (RGB) camera for human-robot interaction and context information. The perception suite 214 may additionally include a high resolution RGB camera for object classification. A face light ring surrounding the perception suite 214 may also be included for improved human-robot interaction and scene illumination. In some examples, the perception suite 214 may also include a projector configured to project images and/or video into the environment.

Figure 4:
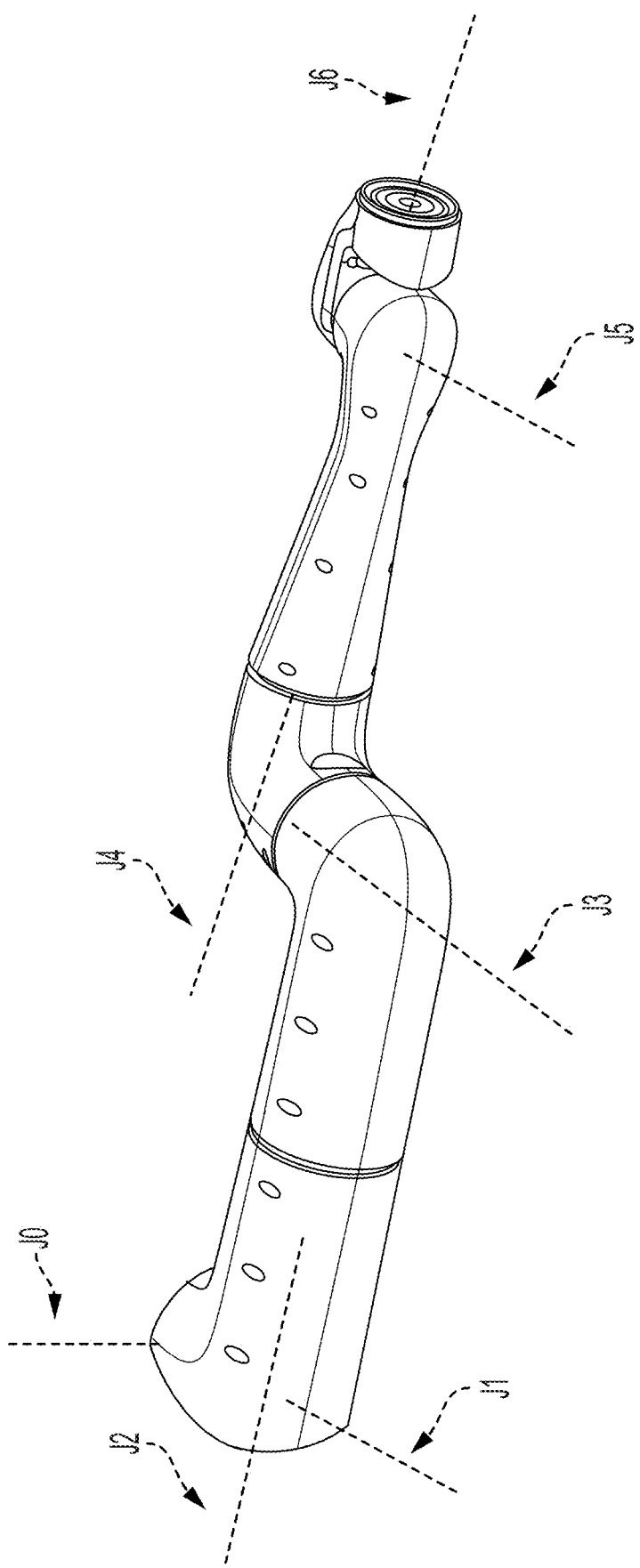
FIG. 4 illustrates a robotic arm, in accordance with example embodiments.

FIG. 4 illustrates a robotic arm, in accordance with example embodiments. The robotic arm includes 7 DOFs: a shoulder yaw J0 joint, a shoulder pitch J1 joint, a bicep roll J2 joint, an elbow pitch J3 joint, a forearm roll J4 joint, a wrist pitch J5 joint, and wrist roll J6 joint. Each of the joints may be coupled to one or more actuators. The actuators coupled to the joints may be operable to cause movement of links down the kinematic chain (as well as any end effector attached to the robot arm).

The shoulder yaw J0 joint allows the robot arm to rotate toward the front and toward the back of the robot. One beneficial use of this motion is to allow the robot to pick up an object in front of the robot and quickly place the object on the rear section of the robot (as well as the reverse motion). Another beneficial use of this motion is to quickly move the robot arm from a stowed configuration behind the robot to an active position in front of the robot (as well as the reverse motion).

The shoulder pitch J1 joint allows the robot to lift the robot arm (e.g., so that the bicep is up to perception suite level on the robot) and to lower the robot arm (e.g., so that the bicep is just above the mobile base). This motion is beneficial to allow the robot to efficiently perform manipulation operations (e.g., top grasps and side grasps) at different target height levels in the environment. For instance, the shoulder pitch J1 joint may be rotated to a vertical up position to allow the robot to easily manipulate objects on a table in the environment. The shoulder pitch J1 joint may be rotated to a vertical down position to allow the robot to easily manipulate objects on a ground surface in the environment.

The bicep roll J2 joint allows the robot to rotate the bicep to move the elbow and forearm relative to the bicep. This motion may be particularly beneficial for facilitating a clear view of the EOAS by the robot's perception suite. By rotating the bicep roll J2 joint, the robot may kick out the elbow and forearm to improve line of sight to an object held in a gripper of the robot.

Moving down the kinematic chain, alternating pitch and roll joints (a shoulder pitch J1 joint, a bicep roll J2 joint, an elbow pitch J3 joint, a forearm roll J4 joint, a wrist pitch J5 joint, and wrist roll J6 joint) are provided to improve the manipulability of the robotic arm. The axes of the wrist pitch J5 joint, the wrist roll J6 joint, and the forearm roll J4 joint are intersecting for reduced arm motion to reorient objects. The wrist roll J6 point is provided instead of two pitch joints in the wrist in order to improve object rotation.

In some examples, a robotic arm such as the one illustrated in FIG. 4 may be capable of operating in a teach mode. In particular, teach mode may be an operating mode of the robotic arm that allows a user to physically interact with and guide robotic arm towards carrying out and recording various movements. In a teaching mode, an external force is applied (e.g., by the user) to the robotic arm based on a teaching input that is intended to teach the robot regarding how to carry out a specific task. The robotic arm may thus obtain data regarding how to carry out the specific task based on instructions and guidance from the user. Such data may relate to a plurality of configurations of mechanical components, joint position data, velocity data, acceleration data, torque data, force data, and power data, among other possibilities.

During teach mode the user may grasp onto the EOAS or wrist in some examples or onto any part of robotic arm in other examples, and provide an external force by physically moving robotic arm. In particular, the user may guide the robotic arm towards grasping onto an object and then moving the object from a first location to a second location. As the user guides the robotic arm during teach mode, the robot may obtain and record data related to the movement such that the robotic arm may be configured to independently carry out the task at a future time during independent operation (e.g., when the robotic arm operates independently outside of teach mode). In some examples, external forces may also be applied by other entities in the physical workspace such as by other objects, machines, or robotic systems, among other possibilities.

Figure 5:
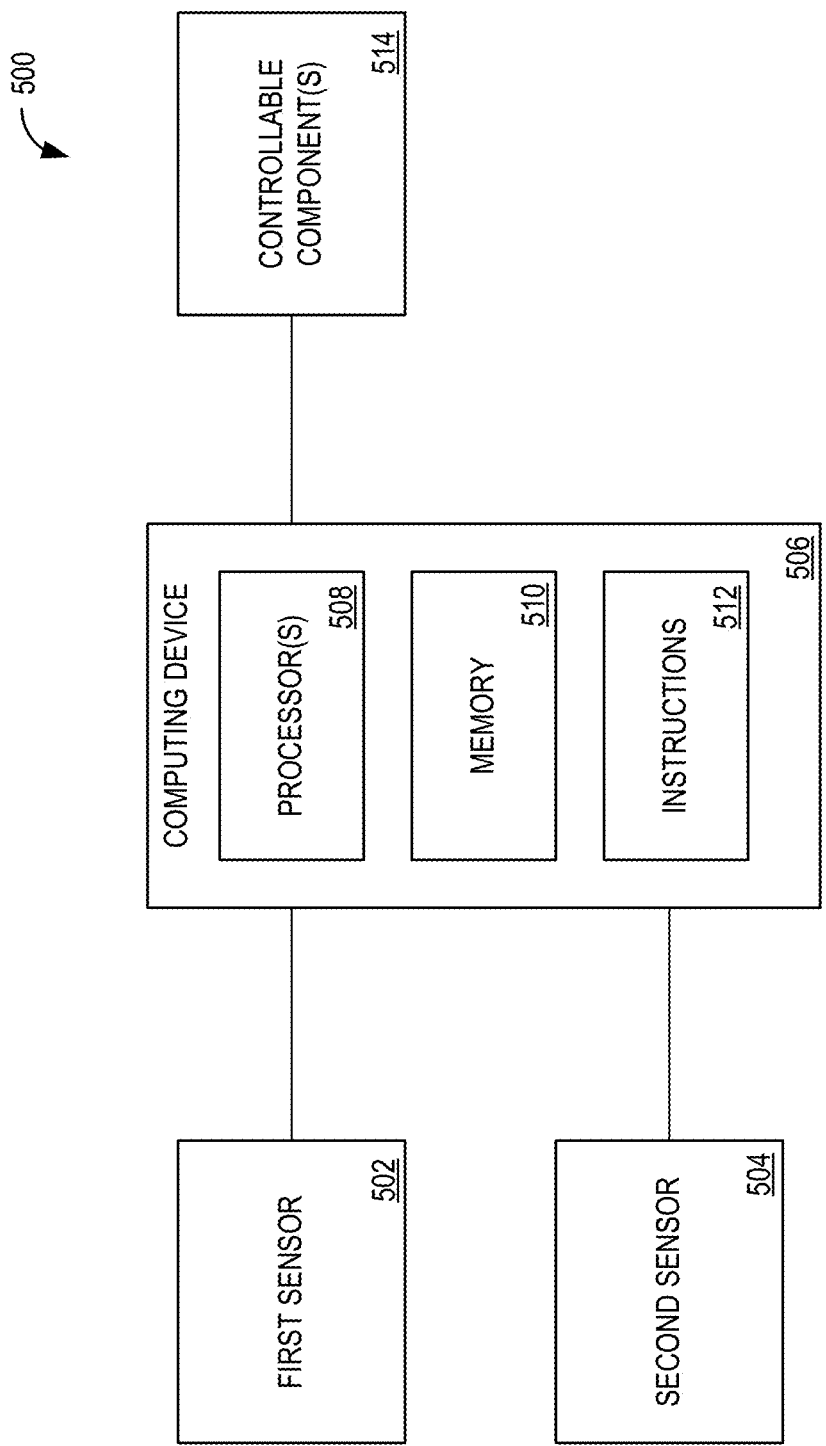
FIG. 5 is a block diagram of a system, in accordance with example embodiments.

FIG. 5 is a block diagram of a 500 system, in accordance with example embodiments. In particular, FIG. 5 shows a first sensor 502, a second sensor 504, a computing device 506, and one or more controllable component(s) 514.

First sensor 502 can include a first type of sensor used for generating a first depth map. For example, the first sensor 502 can be a multiscopic (e.g., stereoscopic) image sensor that captures a plurality of images of an environment at different poses. Depth information can be derived from the multiscopic images by mapping pixels of each image to those of another image, and determining disparities between the corresponding pixels. First sensor 502 can include other sensor types as well.

Second sensor 504 can include a second type of sensor used for generating a second depth map. For example, the second sensor 504 can be a monoscopic sensor that captures a single image of an environment from a single pose. Depth information can be derived from implied perspective of edges in the image and from identified objects in the image. For example, a neural network can be trained to take a monocular image as an input and output a depth map based on the monocular image. Second sensor 504 can include other sensor types as well.

The first depth map and the second depth map may be determined, for example, by computing device 506 or by another computing device, or can be determined by the first sensor 502 and the second sensor 504 respectively. In some contexts, first sensor 502 and second sensor 504 can be mounted on a robot, such as robot 200 described above with respect to FIGS. 2 and 3 (e.g., first sensor 502 and second sensor 504 can respectively correspond to the IR-assisted stereo depth sensor and the wide-angled RGB camera described above with respect to the perception suite 214). Depth information determined from the first depth map and the second depth map can allow robot 200 to navigate within an environment, or allow for robot 200 to interact with objects in the environment (e.g., using the robotic arm shown in FIG. 4).

Computing device 506 includes one or more processor(s) 508, a memory 510, and instructions 512.

Processor(s) 508 may operate as one or more general-purpose hardware processors or special purpose hardware processors (e.g., digital signal processors, application specific integrated circuits, etc.). Processor(s) 508 may be configured to execute computer-readable program instructions (e.g., instructions 512) and manipulate data, such as depth map information or sensor data received from first sensor 502 and second sensor 504, which may be stored in memory 510. Processor(s) 508 may also directly or indirectly interact with other components of system 500 or other systems or components (e.g., robotic system 100, sensor(s) 112, power source(s) 114, mechanical components 110, or electrical components 116). In some examples, processor(s) 508 can correspond to processor(s) 102 described above with respect to FIG. 1.

Memory 510 may be one or more types of hardware memory. For example, Memory 510 may include or take the form of one or more computer-readable storage media that can be read or accessed by processor(s) 508. The one or more computer-readable storage media can include volatile or non-volatile storage components, such as optical, magnetic, organic, or another type of memory or storage, which can be integrated in whole or in part with processor(s) 508. In some implementations, memory 510 can be a single physical device. In other implementations, data storage 104 can be implemented using two or more physical devices, which may communicate with one another via wired or wireless communication. As noted previously, memory 510 may include computer-readable program instructions (e.g., instructions 512) and data. The data may be any type of data, such as configuration data, sensor data, or diagnostic data, among other possibilities.

Computing device 506 is configured for performing operations related to depth maps, such as receiving or generating two or more depth maps from first sensor 502 and second sensor 504 and generating a depth map based on fusing the two or more depth maps. For example, processor(s) 508 can execute instructions 512 to carry out such operations. For example, different pixel depths in a fused depth map may correspond to different sensors, an average of pixel depths derived from two or more sensors, or can be transformed in other ways. Computing device 506 can be further configured to determine, for each respective pixel depth, a pixelwise confidence level indicative of a likelihood that the respective pixel depth accurately represents a distance to a feature of the environment. Computing device 506 can be further configured to generate a pixelwise filterable depth map.

The pixelwise filterable depth map can be filterable to produce an operation specific depth map that is determined based on a comparison of each respective pixelwise confidence level with a confidence threshold corresponding to a given operation performed by controllable component(s) 514. For example, this operation may be an operation of a robot. In these examples, controllable component(s) 514 can correspond to mechanical components 110, electrical components 116, or sensors 112 described above with respect to FIG. 1. Examples related to generating the pixelwise filterable depth map and performing corresponding operations are described below with respect to FIGS. 6A-6D and FIG. 7.

Computing device 506, and system 500 more generally, can be incorporated into one or more other systems, such as robotic system 100. For example, computing device 506 can be the same as control system 118 of robotic system 100 or be incorporated into robotic system 100 as a subsystem for depth sensing operations.

Figure 6A:
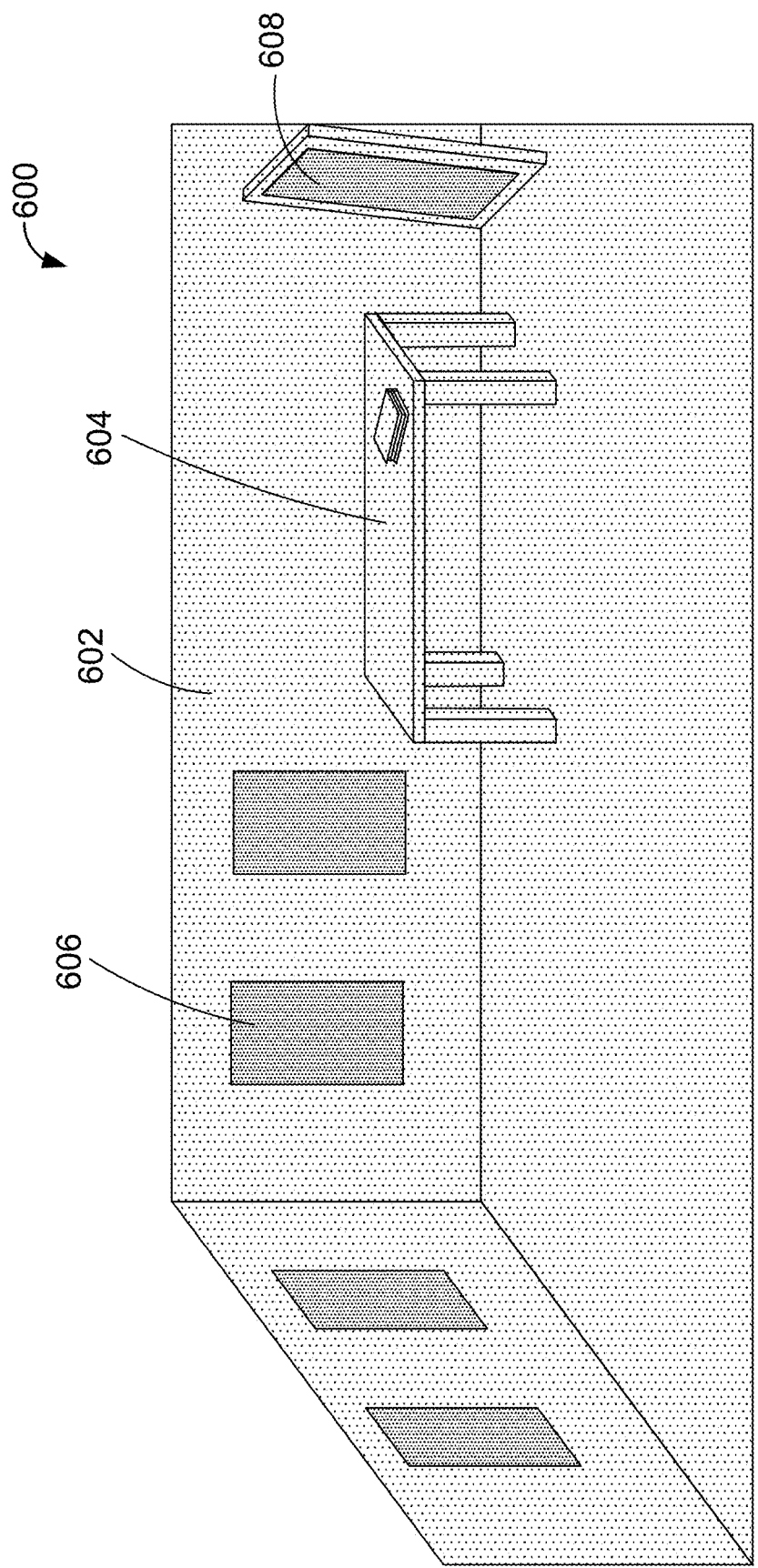
FIG. 6A illustrates a depth map, in accordance with example embodiments.

FIG. 6A illustrates a depth map 600, in accordance with example embodiments. In particular, FIG. 6A shows a simplified illustration of a depth map in which data points are shown as dots and perspective lines are drawn to provide an impression of depth. Thus, FIG. 6A shows portions of a scene for which first depth map 600 includes information. In practice, first depth map 600 may visually be represented by voxels or another form of 3D rendering. For processing purposes, the depth map can be represented by a 2D array of pixel depths. The following description of FIGS. 6A-6D shows a simplified representation of depth map 600 and related depth maps.

Depth map 600 includes first portions 602 and 604 that correspond to a first sensor (e.g., first sensor 502). The first sensor may be a multiscopic image capture device, such as a stereoscopic image capture device. First portions 602 and 604 of depth map 600 may correspond to portions of a first depth map that include depth information. Depth map 600 further includes second portions 606 and 608 that correspond to a second sensor (e.g., second sensor 504). Second portions 606 and 608 of depth may 600 may correspond to portions of a second depth map that have been merged with the first depth map to fill in portions of the first depth map that lack a sufficient amount of depth information. The second sensor may be a monoscopic image capture device. The second sensor may be less accurate than the first sensor. Accordingly, for purposes of the following examples, first portions 602 and 604 can be considered more likely to include accurate depth information than second portions 606 and 608. In FIG. 6A first portions 602 and 604 are shaded differently from second portions 606 and 608 to illustrate that these portions correspond to different sensors. In practice, depth map 600 might not provide a visual indication of which sensor corresponds to which portion.

Figure 6B:
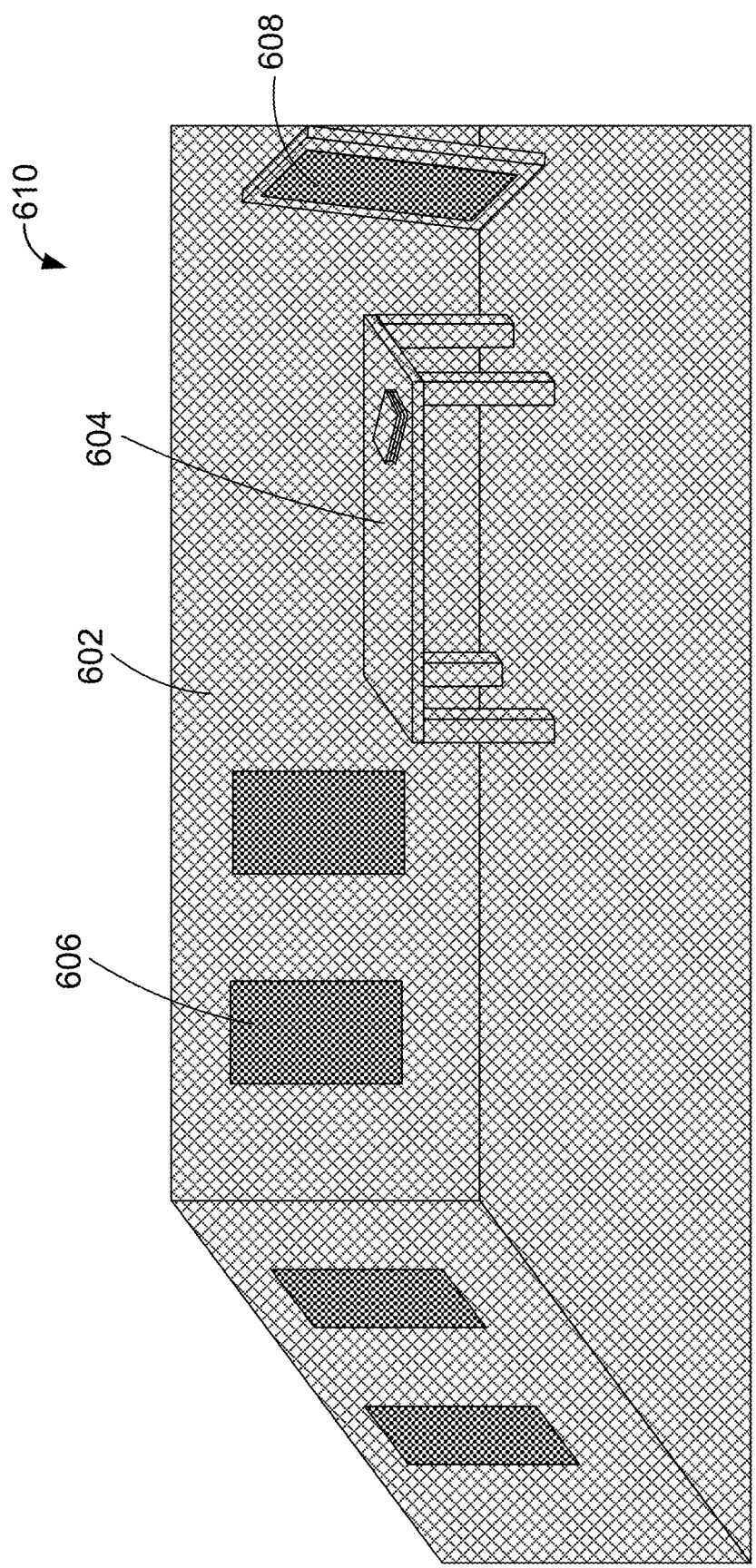
FIG. 6B illustrates a pixelwise filterable depth map, in accordance with example embodiments.

FIG. 6B illustrates a pixelwise filterable depth map 610, in accordance with example embodiments. The pixelwise filterable depth map 610 may indicate a confidence level for each pixel depth in depth map 600. Accordingly, pixelwise filterable depth map 610 includes first portions 602 and 604 and second portions 606 and 608. As noted above, first portions 602 and 604 can be considered more likely to include accurate depth information than second portions 606 and 608. Accordingly, a confidence level can be assigned to each pixel depth that indicates this disparity. In some examples, this can be a discrete confidence level (e.g., 1 or 0) that indicates which sensor is associated with a given pixel depth. In other examples, a confidence score can be associated with each sensor, and each pixel corresponding to a given sensor can be assigned an associated confidence score. Other ways of determining confidence levels based on sensors are possible. In FIG. 6B first portions 602 and 604 are shaded differently from second portions 606 and 608 to illustrate that these portions correspond to different confidence levels.

Figure 6C:
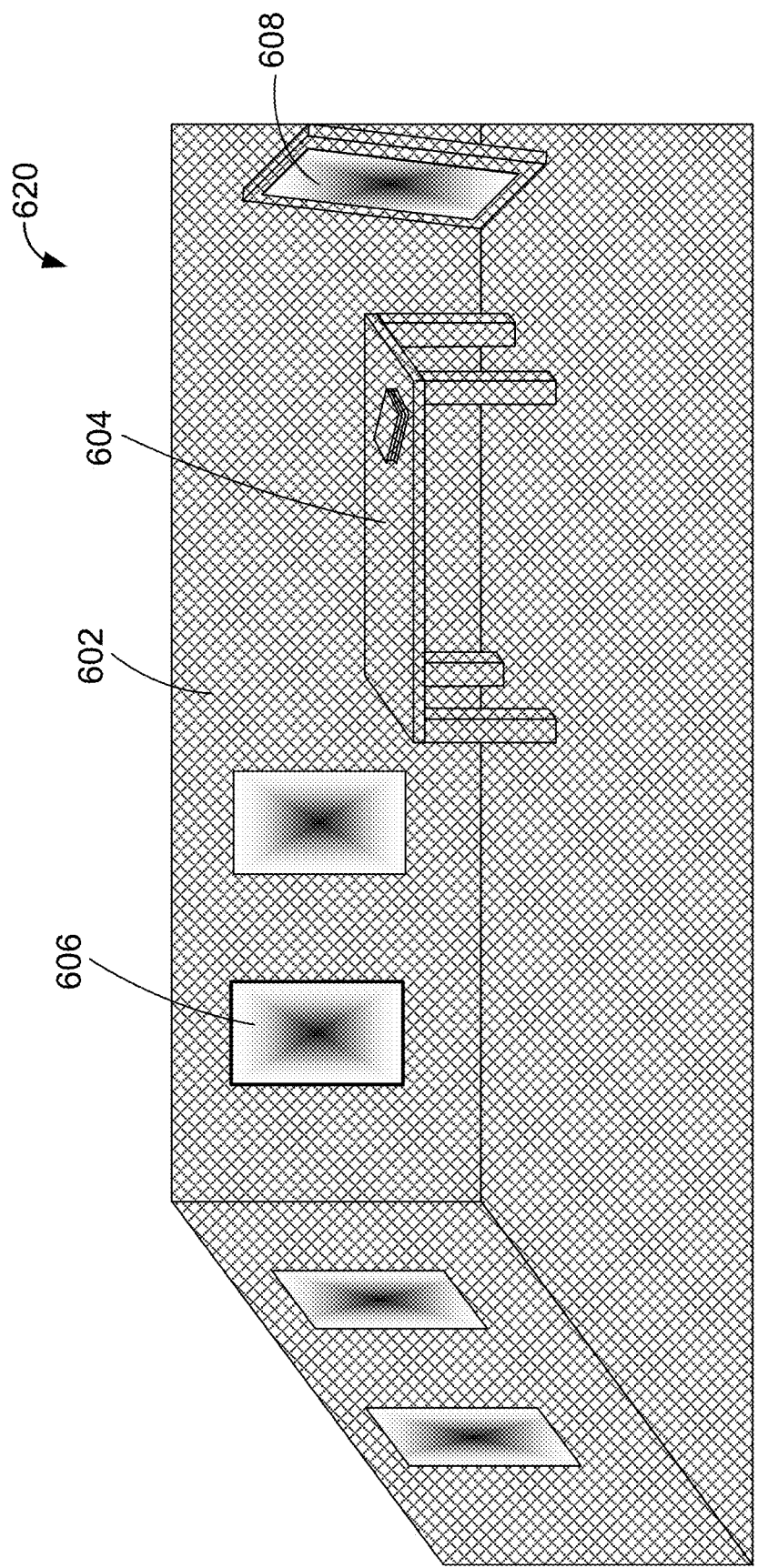
FIG. 6C illustrates a pixelwise filterable depth map, in accordance with example embodiments.

FIG. 6C illustrates another pixelwise filterable depth map 620, in accordance with example embodiments. The pixelwise filterable depth map 620 may indicate a confidence level for each pixel depth in depth map 600. Accordingly, pixelwise filterable depth map 620 includes first portions 602 and 604 and second portions 606 and 608. As noted above, first portions 602 and 604 can be considered more likely to include accurate depth information than second portions 606 and 608. Accordingly, a confidence level can be assigned to each pixel depth that indicates this disparity. In FIG. 6C, pixel depths in second portions 606 and 608 are depicted as having a variable confidence level. The confidence level for each pixel depth in second portions 606 and 608 can be determined based on a proximity to other portions of the depth map having a higher confidence level. For example, second portion 606 is adjacent to first portion 602. First portion 602 and second portion 606 adjoin at a plurality of edge pixel depths. Determining the confidence level for a given pixel depth in second portion 606 can be based on a distance (e.g., a number of pixel depths) between the given pixel depth and the edge pixel depths. In the present example, pixel depths disposed towards the center of second portion 606 are have lower confidence levels than pixel depths disposed towards the perimeter of second portion 606. Other ways of determining confidence levels are possible.

Within examples, determining confidence levels can include determining whether two or more sensors corroborate one another. Having corroborating depth information from two depth maps used to generate depth map 600 may increase the likelihood that the pixel depths in depth map 600 are accurate. For example, this may involve, for each pixel depth in depth map 600, comparing pixel depths from the two or more sensors, determining a degree of similarity between the compared pixel depths (e.g., a ratio of distances represented by the compared pixel depths) for each respective pixel depth in the depth map, and determining, for each respective pixel depth, the pixelwise confidence level based at least in part on determining the degree of similarity between the compared pixel depths for each respective pixel depth in depth map 600. Other ways of determining confidence levels are possible.

Figure 6D:
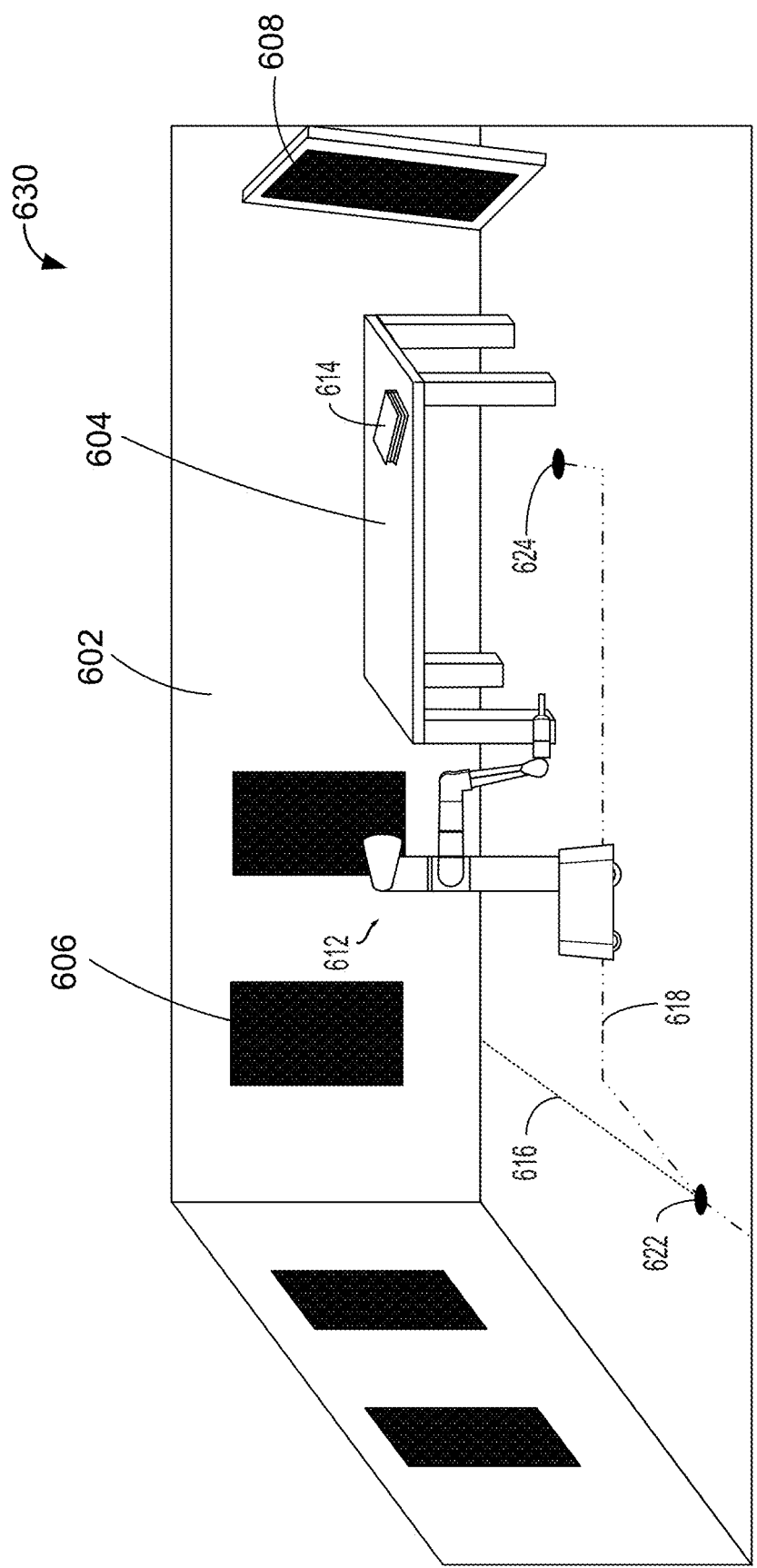
FIG. 6D illustrates a robot navigating using an operation specific depth map, in accordance with example embodiments.

FIG. 6D illustrates a robot navigating using an operation specific depth map 630, in accordance with example embodiments. Operation specific depth map 630 can be generated based on a confidence threshold associated with a particular operation (e.g., an operation of controllable component(s) 514 or of robot 200, controllable by a control system such as control system 118 of robotic system 100). The confidence threshold can be applied to a pixelwise filterable depth map to determine portions of the depth map that are not used for purposes of performing an operation. Different outcomes of generating the operation specific depth map 630

FIG. 6D depicts an example scenario in which a robot 612 is performing an operation that includes navigating within an environment and interacting with an object 614. In the example scenario, robot 612 uses two or more sensors to generate depth map 600, determines, a pixelwise confidence level indicative of a likelihood that each respective pixel depth in depth map 600 accurately represents a distance between the robot 612 and a feature of the environment, and generates a pixelwise filterable depth map, such as pixelwise filterable depth map 610 or pixelwise filterable depth map 620.

Upon initiating the operations, a control system of robot 612 generates robot operation specific depth map 630 by comparing each pixel depth in pixelwise filterable depth map 610 or 620 to a confidence threshold associated with the operations. In the example scenario, first portions 602 and 604 meet or exceed the confidence threshold and second portions 606 and 608 do not meet or exceed the confidence threshold. Accordingly, depth information from first portions 602 and 604 is unfiltered and are used for performing the operations and depth information from second portions 606 and 608 is filtered and is not used for performing the operations. Filtering the depth map in this manner can allow for less processing strain for a control system of robot 612 because the unused portions of robot operation specific depth map 630 might not be considered during the operations.

After generating the robot operation specific depth map 630, the robot controller begins navigating along trajectory 616 as part of path 618. At decision point 622, a control system of robot 612 determines that trajectory 616 directs robot 612 to a filtered portion of robot operation specific depth map 630 and alters path 618 to avoid trajectory 616. Robot 612 may continue along path 618 until reaching ending point 624 and interacting with object 614. While traveling along path 618, robot 612 may determine additional pixelwise filterable depth maps and filter them in accordance with the confidence threshold to evaluate the environment as the robot 612 navigates. In this manner, robot 614 can leverage pixelwise filterable depth map 610 and a confidence threshold associated with navigating robot 612 to navigate in portions of an environment for which there is viable depth information, and to avoid other areas of the environment.

A control system of robot 612 can interpret robot operation specific depth map 630 prior to starting an operation as well. For example, if a given proportion of robot operation specific depth map 630 is filtered (e.g., greater than 80%) robot 612 may not navigate through the environment, and instead may remain idle until additional information is available to improve the depth map. As another example, robot 612 might only perform an operation in areas that are uninterrupted by filtered portions of the robot specific depth map 630. For example, a control system of robot 612 can determine that the used portion of the robot operation specific depth map 630 includes an uninterrupted region of unfiltered pixel depths that exceeds a threshold region size (e.g., a region corresponding to a 10 foot radius in front of robot 612), and perform an operation responsive to determining that the uninterrupted region exceeds the threshold region size. Different operations may correspond to different analyses of the robot operation specific depth map before or during performance of a robot operation.

Within examples, the confidence threshold can be a pixelwise confidence threshold. For example, the pixelwise confidence threshold may be higher directly in front of robot 612 than it is to either side. This can allow robot 612 to be discerning in its direction of travel, but to take secondary information into account for processing purposes. The pixelwise confidence threshold can likewise be dynamically changed depending on an operation of robot 612.

FIG. 6D is depicted with robot 612 navigating in an environment for illustrative purposes. In practice, a robot operation specific depth map can be determined from the perspective of one or more sensors on robot 612, and thus the robot operation specific depth map can change as the robot navigates within the environment.

Figure 7:
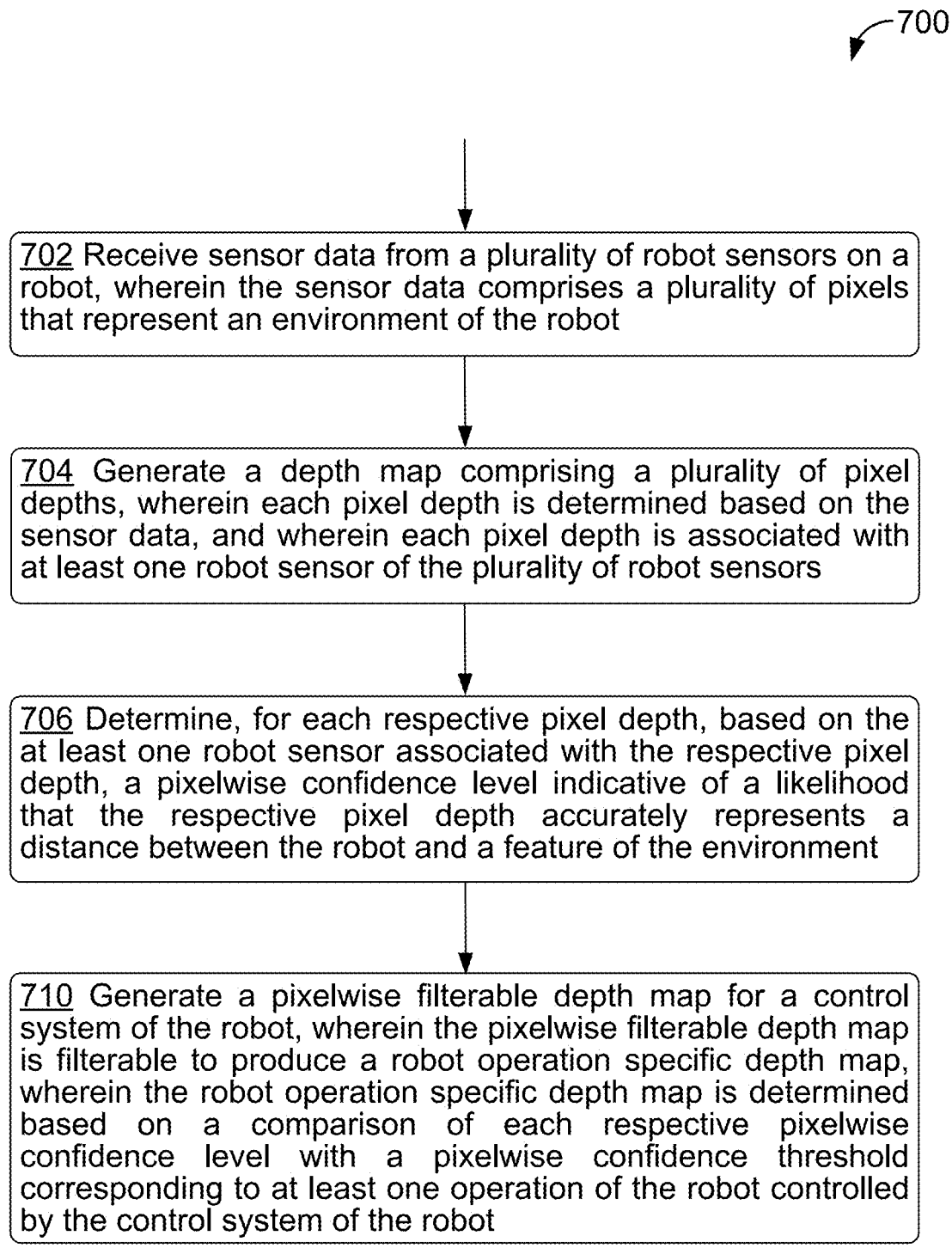
FIG. 7 is a block diagram of a method, in accordance with example embodiments.

FIG. 7 is a block diagram of a method 700, in accordance with example embodiments. In some examples, method 700 of FIG. 7 may be carried out by a control system, such as control system 118 of robotic system 100 or a computing device such as computing device 506 of system 500. In further examples, method 700 may be carried by one or more processors, such as processor(s) 102 and/or processor(s) 508, executing program instructions, such as program instructions 106 and/or instructions 512, stored in a data storage, such as data storage 104 and/or memory 510. Execution of method 700 may involve a robotic device, such as illustrated and described with respect to FIGS. 1-4 and 6D, or another system. Other robotic devices may also be used in the performance of method 700. In further examples, some or all of the blocks of method 700 may be performed by a control system remote from the robotic device or from system 500. In yet further examples, different blocks of method 700 may be performed by different control systems, located on and/or remote from a robotic device or from system 500.

At block 702, method 700 includes receiving sensor data from a plurality of robot sensors (e.g., a stereoscopic image capture device and an RGB monoscopic image capture device) on a robot (e.g., robot 612). The sensor data can include a plurality of pixels that represent an environment of the robot.

At block 704, method 700 includes generating a depth map that includes a plurality of pixel depths. Each pixel depth can be determined based on the sensor data. Each pixel depth can be associated with at least one robot sensor of the plurality of robot sensors. For example, a depth map derived from a first sensor can be fused with a depth map from a second sensor, and pixel depths in the fused depth map can correspond to pixel depths in one or both of the first depth map and the second depth map.

At block 706, method 700 includes determining, for each respective pixel depth, based on the at least one robot sensor associated with the respective pixel depth, a pixelwise confidence level indicative of a likelihood that the respective pixel depth accurately represents a distance between the robot and a feature of the environment. For example, a confidence level can be assigned to each pixel based on which sensor is associated with the pixel. Within examples, certain sensors may provide more accurate depth information, and thus be associated with a higher confidence level. The confidence level can correspond to (e.g., be inversely proportional to) a variance in depth estimates provided by the sensor.

At block 708, method 700 includes generating a pixelwise filterable depth map for a control system of the robot. The pixelwise filterable depth map can be filterable to produce a robot operation specific depth map. The robot operation specific depth map can be determined based on a comparison of each respective pixelwise confidence level with a confidence threshold (e.g., the threshold can be different for each pixel depth) corresponding to at least one operation of the robot controlled by the control system of the robot.

Within examples, method 700 further includes determining a set of confidence levels for the pixelwise confidence levels based on the plurality of robot sensors. For example, a first confidence level in the set of confidence levels can correspond to a first sensor and a second confidence level in the set of confidence levels can correspond to a second sensor. The confidence levels can be retrieved from a memory, such as memory 510 or another data storage device (e.g., a remote database). Within examples, the first confidence level may be above the confidence threshold and the second confidence level may be below the confidence threshold (e.g., as depicted in FIGS. 6A-6D). In these examples, method 700 can further include filtering out pixels from the pixelwise filterable depth map that correspond to the second sensor. Within examples, the first sensor can include a stereoscopic image capture device and the second sensor can include a monoscopic image capture device. Accordingly, depending on an operation of the robot, pixel depths associated with the monoscopic image capture device can be filtered out of a robot operation specific depth map and pixel depths associated with a stereoscopic image capture device can remain for use in robot operations. Within other examples, the first sensor can include a light ranging and detection (LIDAR) device and the second sensor can include an image capture device. The LIDAR device might have a higher associated confidence level than that of the image capture device.

Within examples, the depth map can include a first region associated with a first sensor (e.g., portion 602) and a second region associated with a second sensor (e.g., portion 606). The second region can be adjacent to the first region such that the first region and the second region adjoin at a plurality of edge pixel depths. In these examples, determining the pixelwise confidence level for each pixel depth can include determining a confidence level for each pixel depth in the second region based on a distance between the pixel and the plurality of edge pixel depths. For example, this may be performed in accordance with FIG. 6C and the corresponding description thereof.

Within examples, method 700 further includes receiving, via a user interface, a user-selected confidence threshold associated with the at least one operation of the robot. The user-selected confidence threshold corresponds to the confidence threshold, and filtering the pixelwise filterable depth map to produce a robot operation specific depth map associated with the user-selected confidence threshold. In this manner, a user can manually select how discerning a robot is when performing a certain task, such as navigating in an environment or interacting with objects.

Within examples, method 700 further includes initiating an operation of the robot, and filtering the pixelwise filterable depth map based on a confidence threshold associated with the operation of the robot to produce a robot operation specific depth map. The robot operation specific depth map can include a used portion (e.g., portion 602) that includes unfiltered pixel depths and an unused portion (e.g., portion 606) that includes filtered pixel depths. In these examples, method 700 may further include performing the operation of the robot using the unfiltered pixel depths in the used portion of the operation specific depth map.

In related examples, method 700 can include determining a proportion of unfiltered pixel depths relative to a total number of pixel depths in the pixelwise filterable depth map (e.g., 90% of the total number of pixel depths can be part of the used portion), and determining that the proportion of unfiltered pixel depths exceeds a threshold proportion (e.g., 80%) of unfiltered pixel depths associated with the operation of the robot. In these examples, performing the operation of the robot can include performing the operation of the robot responsive to determining that the proportion of unfiltered pixel depths exceeds the threshold proportion of unfiltered pixel depths.

In related examples, method 700 can include determining that the used portion of the robot operation specific depth map includes an uninterrupted region of unfiltered pixel depths that exceeds a threshold region size (e.g., a radius of pixel depths corresponding to a 10 foot radius around the robot). In these examples, performing the operation of the robot can include, performing the operation of the robot responsive to determining that the used portion of the robot operation specific depth map comprises the uninterrupted region of unfiltered pixel depths that exceeds the threshold region size.

In related examples, the operation of the robot can include navigating the robot within the environment. In these examples, method 700 can further include selecting a path for navigating the robot within the environment that corresponds to the used portion of the robot operation specific depth map. In these examples, method 700 can further include navigating the robot within the environment, changing the robot operation specific depth map while navigating the robot within the environment based on additional sensor data from the at least one sensor, and updating the path for navigating the robot within the environment based on a change in the used portion of robot operation specific depth map. This can be performed in accordance with FIG. 6D and the corresponding description thereof.

Within examples, a plurality of robot operations each correspond to a different confidence threshold. In these examples, method 700 can further include receiving an instruction to perform a robot operation, selecting a confidence threshold based on the robot operation, and filtering the pixelwise filterable depth map based on the selected confidence threshold associated with the operation of the robot to produce a robot operation specific depth map.

Within examples, determining, for each respective pixel depth, the pixelwise confidence level can include comparing pixel depths from two or more sensors, determining a degree of similarity between the compared pixel depths for each respective pixel depth in the depth map, and determining, for each respective pixel depth, the pixelwise confidence level based at least in part on determining the degree of similarity between the compared pixel depths for each respective pixel depth in the depth map.

Though the functions described with respect to method 700 generally refer to robot operations, it should be understood that similar functionality can be implemented in other systems, such as vehicle systems or imaging systems.

III. CONCLUSION

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software or hardware modules in the same physical device. However, other information transmissions may be between software modules or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method comprising:

receiving sensor data from a plurality of robot sensors on a robot, including at least a first type of sensor and a second type of sensor, wherein the sensor data comprises a plurality of pixels that represent an environment of the robot;

generating a depth map comprising a plurality of pixel depths, wherein each pixel depth is determined based on the sensor data, and wherein each pixel depth is associated with at least one robot sensor of the plurality of robot sensors;

determining, for each respective pixel depth, based on the type of sensor of the at least one robot sensor associated with the respective pixel depth, a pixelwise confidence level indicative of a likelihood that the respective pixel depth accurately represents a distance between the robot and a feature of the environment;

generating, based on the pixelwise confidence level determined for each respective pixel depth, a pixelwise filterable depth map for a control system of the robot;

determining, for the robot, a confidence threshold for a particular robot operation;

filtering the pixelwise filterable depth map to produce a robot operation specific depth map, wherein the robot operation specific depth map is determined based on a comparison of each respective pixelwise confidence level with the confidence threshold corresponding to the particular robot operation of the robot controlled by the control system of the robot; and controlling, by the control system, the robot to perform the particular robot operation based on the robot operation specific depth map.

2. The method of claim 1, further comprising determining a set of confidence levels for the pixelwise confidence levels based on the plurality of robot sensors, wherein a first confidence level in the set of confidence levels corresponds to the first type of sensor and wherein a second confidence level in the set of confidence levels corresponds to the second type of sensor.

3. The method of claim 2, wherein the first confidence level is above the confidence threshold and the second confidence level is below the confidence threshold, the method further comprising filtering out pixels from the pixelwise filterable depth map that correspond to the second type of sensor.

4. The method of claim 3, wherein the first type of sensor comprises a stereoscopic image capture device and wherein the second type of sensor comprises a monoscopic image capture device.

5. The method of claim 3, wherein the first type of sensor comprises a light ranging and detection (LIDAR) device and wherein the second type of sensor comprises an image capture device.

6. The method of claim 1, wherein the depth map comprises a first region associated with a first sensor and a second region associated with a second sensor, wherein the second region is adjacent to the first region such that the first region and the second region adjoin at a plurality of edge pixel depths, and wherein determining the pixelwise confidence level for each pixel depth comprises:

determining a confidence level for each pixel depth in the second region based on a distance between the pixel and the plurality of edge pixel depths.

7. The method of claim 1, further comprising:

receiving, via a user interface, a user-selected confidence threshold associated with the particular robot operation, wherein the user-selected confidence threshold corresponds to the confidence threshold; and filtering the pixelwise filterable depth map to produce a robot operation specific depth map associated with the user-selected confidence threshold.

8. The method of claim 1, wherein the robot operation specific depth map comprises a used portion comprising unfiltered pixel depths and an unused portion comprising filtered pixel depths; and the method further comprises:

performing the operation of the robot using the unfiltered pixel depths in the used portion of the operation specific depth map.

9. The method of claim 8, further comprising:

determining a proportion of unfiltered pixel depths relative to a total number of pixel depths in the pixelwise filterable depth map; and determining that the proportion of unfiltered pixel depths exceeds a threshold proportion of unfiltered pixel depths associated with the operation of the robot, wherein performing the operation of the robot comprises, performing the operation of the robot responsive to determining that the proportion of unfiltered pixel depths exceeds the threshold proportion of unfiltered pixel depths.

10. The method of claim 8, further comprising:

determining that the used portion of the robot operation specific depth map comprises an uninterrupted region of unfiltered pixel depths that exceeds a threshold region size, wherein performing the operation of the robot comprises, performing the operation of the robot responsive to determining that the used portion of the robot operation specific depth map comprises the uninterrupted region of unfiltered pixel depths that exceeds the threshold region size.

11. The method of claim 8, wherein the operation of the robot comprises navigating the robot within the environment, the method further comprising:

selecting a path for navigating the robot within the environment that corresponds to the used portion of the robot operation specific depth map.

12. The method of claim 11, further comprising:

navigating the robot within the environment;

changing the robot operation specific depth map while navigating the robot within the environment based on additional sensor data from the at least one sensor; and updating the path for navigating the robot within the environment based on a change in the used portion of robot operation specific depth map.

13. The method of claim 1, wherein a plurality of robot operations each correspond to a different confidence threshold, the method further comprising:

receiving an instruction to perform the particular robot operation; and selecting the confidence threshold based on the particular robot operation from the plurality of robot operations.

14. The method of claim 1, wherein determining, for each respective pixel depth, the pixelwise confidence level comprises:

comparing pixel depths from two or more sensors;

determining a degree of similarity between the compared pixel depths for each respective pixel depth in the depth map; and determining, for each respective pixel depth, the pixelwise confidence level based at least in part on determining the degree of similarity between the compared pixel depths for each respective pixel depth in the depth map.

15. A robot comprising:

a first sensor of a first type;

a second sensor of a second type;

a control system having one or more processors;

a non-transitory computer readable medium; and program instructions stored on the non-transitory computer readable medium and executable by the one or more processors to:

receive sensor data from the first sensor and the second sensor, wherein the sensor data comprises a plurality of pixels that represent an environment of the robot;

generate a depth map comprising a plurality of pixel depths, wherein each pixel depth is determined based on the sensor data, and wherein each pixel depth is associated with at least one robot sensor of the first sensor or the second sensor;

determine, for each respective pixel depth, based on the type of sensor of the at least one robot sensor associated with the respective pixel depth, a pixelwise confidence level indicative of a likelihood that the respective pixel depth accurately represents a distance between the robot and a feature of the environment;

generate, based on the pixelwise confidence level determined for each respective pixel depth, a pixelwise filterable depth map for a control system of the robot;

determine, for the robot, a confidence threshold for a particular robot operation;

filter the pixelwise filterable depth map to produce a robot operation specific depth map, wherein the robot operation specific depth map is determined based on a comparison of each respective pixelwise confidence level with the confidence threshold corresponding to the particular robot operation of the robot controlled by the control system of the robot; and control, by the control system, the robot to perform the particular robot operation based on the robot operation specific depth map.

16. The system of claim 15, the program instructions being further executable to:

initiate an operation of the robot;

filter the pixelwise filterable depth map based on a confidence threshold associated with the operation of the robot to produce a robot operation specific depth map, wherein the robot operation specific depth map comprises a used portion comprising unfiltered pixel depths and an unused portion comprising filtered pixel depths; and perform the operation of the robot using the unfiltered pixel depths in the used portion of the operation specific depth map.

17. The system of claim 16, the program instructions being further executable to:

determine a proportion of unfiltered pixel depths relative to a total number of pixel depths in the pixelwise filterable depth map; and determine that the proportion of unfiltered pixel depths exceeds a threshold proportion of unfiltered pixel depths associated with the operation of the robot, wherein performing the operation of the robot comprises performing the operation of the robot responsive to determining that the proportion of unfiltered pixel depths exceeds the threshold proportion of unfiltered pixel depths.

18. The system of claim 16, the program instructions being further executable to:

determine that the used portion of the robot operation specific depth map comprises an uninterrupted region of unfiltered pixel depths that exceeds a threshold region size, wherein performing the operation of the robot comprises, performing the operation of the robot responsive to determining that the used portion of the robot operation specific depth map comprises the uninterrupted region of unfiltered pixel depths that exceeds the threshold region size.

19. The system of claim 16, wherein the operation of the robot comprises navigating the robot within the environment, the program instructions being further executable to:

select a path for navigating the robot within the environment that corresponds to the used portion of the robot operation specific depth map;

navigate the robot within the environment;

change the robot operation specific depth map while navigating the robot within the environment based on additional sensor data from the first sensor and the second sensor; and update the path for navigating the robot within the environment based on a change in the used portion of robot operation specific depth map.

20. A non-transitory computer readable medium having stored therein instructions executable by one or more processors to cause a computing system to perform functions comprising:

receiving sensor data from a plurality of robot sensors on a robot, including at least a first type of sensor and a second type of sensor, wherein the sensor data comprises a plurality of pixels that represent an environment of the robot;

generating a depth map comprising a plurality of pixel depths, wherein each pixel depth is determined based on the sensor data, and wherein each pixel depth is associated with at least one robot sensor of the plurality of robot sensors;

determining, for each respective pixel depth, based on the type of sensor of the at least one robot sensor associated with the respective pixel depth, a pixelwise confidence level indicative of a likelihood that the respective pixel depth accurately represents a distance between the robot and a feature of the environment;

generating, based on the pixelwise confidence level determined for each respective pixel depth, a pixelwise filterable depth map for a control system of the robot;

determining, for the robot, a confidence threshold for a particular robot operation;

filtering the pixelwise filterable depth map to produce a robot operation specific depth map, wherein the robot operation specific depth map is determined based on a comparison of each respective pixelwise confidence level with the confidence threshold corresponding to the particular robot operation of the robot controlled by the control system of the robot; and controlling, by the control system, the robot to perform the particular robot operation based on the robot operation specific depth map.

* * * * *